United States Patent [19]

Warihashi

[11] 4,270,038
[45] May 26, 1981

[54] CIGARETTE LIGHTER WITH A BUILT-IN BATTERY CHECKER

[76] Inventor: Yoshinori Warihashi, 43-4, Daita 1-chome, Setagaya-ku, Tokyo, Japan

[21] Appl. No.: 8,042

[22] Filed: Jan. 31, 1979

[30] Foreign Application Priority Data

Feb. 6, 1978 [JP] Japan .............................. 53/12670[U]
Mar. 14, 1978 [JP] Japan .............................. 53/31581[U]

[51] Int. Cl.³ .............................................. F23Q 7/22
[52] U.S. Cl. ................................ 219/269; 219/220; 219/264; 219/268; 340/366 R; 338/119
[58] Field of Search ............... 219/220, 262, 264, 268, 219/269, 267, 494, 517; 240/2 CL; 250/218; 338/119, 196; 340/252, 366 R, 380

[56] References Cited

U.S. PATENT DOCUMENTS

| | | | |
|---|---|---|---|
| 2,220,607 | 11/1940 | Mayo | 219/269 X |
| 2,648,758 | 8/1953 | Kroll et al. | 219/269 |
| 3,471,679 | 10/1969 | Ohnborn | 219/269 |
| 3,502,887 | 3/1970 | Erickson et al. | 219/269 X |
| 3,705,414 | 12/1972 | Senkewich | 219/262 |

FOREIGN PATENT DOCUMENTS

617400 2/1949 United Kingdom .
1151624 5/1969 United Kingdom .
1465777 3/1977 United Kingdom .

Primary Examiner—Volodymyr Y. Mayewsky
Attorney, Agent, or Firm—Staas and Halsey

[57] ABSTRACT

A cigarette lighter with a built-in battery checker for use in automobiles which comprises two parts, one being a heater part in which a movable body provided with a heater at the tip of a push nob is mounted slidably in reciprocal front and rear directions to a holder and the other being a basal part into which the heater part is detachably inserted in such manner that when the push nob is pushed to bring the heater into contact with an electrode plate connected to a battery, the heater can be heated by electric current sent from the battery so as to enable the heater part to be pulled out from the basal part, characterized in that the push nob is provided inside with a variable illumination means in which brightness of the illumination is diminished according to increase in the degree of consumption of the battery and a standard illumination means for comparison in brightness with the variable illumination means. The cigarette lighter of this type is used in automobiles for dual purposes of the inherent cigarette lighter and a battery checker capable of visibly indicating consumption of battery by differential illuminations.

13 Claims, 7 Drawing Figures

CIGARETTE LIGHTER WITH A BUILT-IN BATTERY CHECKER

BACKGROUND OF THE INVENTION

The present invention relates to a cigarette lighter with a built-in battery checker (referred to hereinafter simply as the cigarette lighter/battery checker). More particularly, the present invention relates to a cigarette lighter/battery checker designed to install one or two indicating lamps together with a simple electric circuit therefor in a cigarette lighter for use in automobiles for the dual purposes of lighting up a cigarette and discriminating the degree of comsumption of a battery by visible change in brightness or color of illumination of the indicating lamp or lamps.

Automobiles are generally provided with a cigarette lighter which is actuated by a battery installed in the automobiles. However, this battery provides an electric source for not only the built-in cigarette lighter but also a self-starter, plugs, indoor and outdoor lights, a radio set, etc. If the degree of consumption of the battery goes beyond a certain limit, engines of automobiles would no longer be started up. In such case, a troublesome task such as exchange or recharging of the consumed battery is necessary, which burdens a driver with an unnecessary work, especially when he is on urgent business. On the other hand, consumption of a battery can be detected by measuring its voltage precisely with a precision voltammeter. However, consumption of a battery cannot easily be detected by measuring the voltage conveniently with an ordinary voltmeter. Accordingly, installation of a precision battery checker in automobiles is considered as a countermeasure for preventing excessive consumption of their battery. However, such installation makes the cost go up and requires additional space in the front or side instrument board of an automobile. These reasons make it difficult to put a battery checker into practice. Thus, there is a great demand by the automobile industries for developing a battery checker of a simple structure which can be installed without necessity of any additional space in the front or side instrument board.

BRIEF SUMMARY OF THE INVENTION

It is an object of the present invention to provide a cigarette lighter/battery checker for use in automobiles.

It is another object of the present invention to provide a small signal auto-part which functions for dual purposes of a cigarette lighter and a battery checker and can be embedded in the inside wall, for example, the front instrument board of the automobile.

It is still another object of the present invention to provide a cigarette lighter of a conventional type for use in an automobile which has been equipped in the interior space thereof with a small size battery checker capable of visibly discriminating the degree of consumption of a battery.

It is further object of the present invention to provide a cigarette lighter for use in automobiles which has an illuminating push nob equipped in the interior space thereof with one or two indicating lamps which, on pushing for heating the lighter, simultaneously indicate the degree of consumption of the battery installed in the automobile by differential illuminations.

It is still further object of the present invention to provide a cigarette lighter/battery checker which can check the degree of consumption of a battery even in daytime by comparing the color of a variable illumination means with that of a standard illumination means.

Other objects, features and advantages of the present invention will become apparent more fully from the following description.

DETAILED DESCRIPTION OF THE INVENTION

The above mentioned demand has now been satisfied by incorporating the function of a battery checker into a conventional cigarette lighter for use in automobiles.

In accordance with the present invention, there is provided a cigarette lighter/battery checker for use in automobiles which comprises two parts, one being a heater part in which a movable body provided with a heater at the tip of a push nob is mounted slidably in reciprocal front and rear directions to a holder and the other being a basal part into which the heater part is detachably inserted in such manner that when the push nob is pushed to bring the heater into contact with an electrode plate connected to a battery, the heater can be heated by electric current sent from the battery so as to enable the heater part to be pulled out from the basal part, characterized in that the push nob is provided inside with a variable illumination means in which brightness of the illumination is diminished according to increase in the degree of consumption of the battery and a standard illumination means for comparison in brightness with the variable illumination means.

The present invention can more fully be understood from the description taken in conjunction with the accompanying drawings in which.

Figure 1:
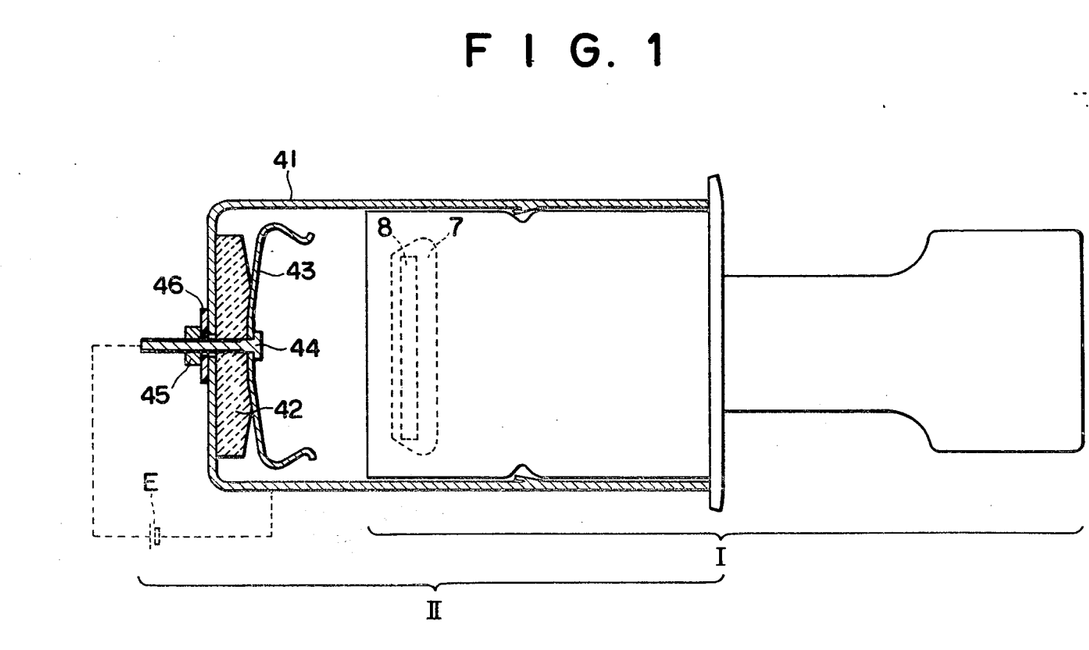
FIG. 1 is a schematic representation showing, partly in section, one example of the cigarette ligher/battery checker of the present invention.

In FIG. 1, the heater part I equipped with the battery checker is detachably inserted into the basal part II usually embedded in the front or side instrument board near a driver seat of a vehicle. The heater part I is usually in the form of a cylinder but may be in the form of a polygonal pillar showing a square or hexagonal figure in cross section. The basal part II is formed in compliance with the figure of the heater part to be inserted thereinto. In the basal part II, a holder 41 is generally cylindrical and is made of an electroconductive material such as a copper alloy. One end of the holder 41 is opened for insertion of the heater part I but the other end is closed and bored to form a hole through which an electrical means for connecting an electrode and a battery can be passed. Inside the holder 41, an electrode plate 43 is fixed to the holder 41 interposed between a ceramic plate 42 and an insulating plate 46 by means of a bolt 44 extending outward through the hole and functioning also as an electrode and a fitting nut 45. Lead wires from the battery E are connected to the bolt 44 and the holder 41.

Figure 2:
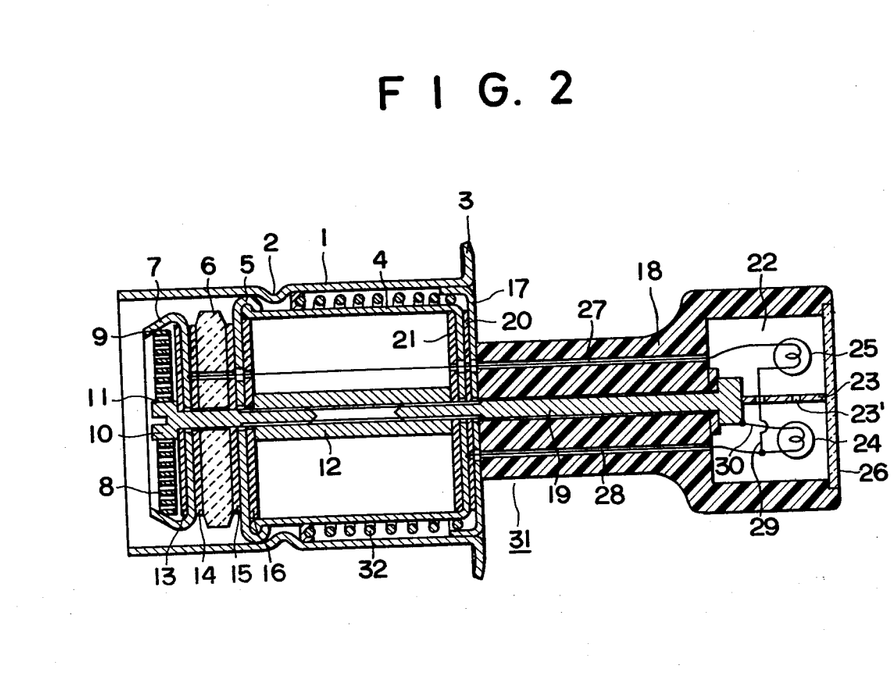
FIG. 2 is a sectional view of the heater part cut in longitudinal direction.

The heater part I is shown in detail in FIG. 2. When the cigarette lighter is not used, a dish 7 receiving a heater 8 is located in a position somewhat distant from the electrode plate 43 as shown by dotted lines in FIG. 1.

In FIG. 2, a holder 1 made of an electroconductive material is usually in the form of a cylinder and is provided around the outer periphery thereof with a concave ring (convex ring on the inner periphery) 2 at any desired position. The front end of the holder 1 is opened and the rear end is bent to outward to form a collar 3. A casing 4 is usually cylindrical and is made of an electroconductive material, the front end of which is blocked with a lid 5 which functions also as a stopper. A ceramic plate 6 usually in the form of a disk functions as an insulating and heat-resisting material and is interposed between the lid 5 and an electroconductive heater dish 7 receiving a heater 8. One end of the heater 8 is connected at a contact point 9 to the heater dish 7 and the other end is connected to a contact point 11 of an electroconductive bolt 10. The heater dish 7 and the heater 8 are mounted to the tip of the casing 4 through the ceramic plate 6 and the lid 5 by means of the bolt 10 and a long nut 12, for example, screw engaged therewith. Mica plates 13, 14, 15 and 16 are interposed between the heater 8 and the heater dish 7, between the heater dish 7 and the ceramic plate 6, between the ceramic plate 6 and the lid 5 and between the lid 5 and the long nut 12, respectively, to secure insulation between the heater dish and the casing. A spring stopper 17 and a push nob 18 are fixed to the rear end of the casing 4 through mica plates 20 and 21 for insulation by means of a long bolt 19 and the long nut 12.

The push nob 18 is made of a heat-resisting plastic resin or the like material and is provided at the rear end with a recessed chamber 22 which is covered with a translucent lid 26 and partitioned into two compartments by a bulkhead 23 optionally provided with a slit 23'. Each compartment is provided with an indicating lamp 24 or 25, the former being connected to the long bolt 19 and the casing 4 through lead wires 30 and 28, respectively, and the latter being connected to the heater dish 7 and the lead wire 28 through lead wires 27 and 29, respectively. In one embodiment of this invention, these lamps are white arc lamps. In other embodiments of this invention, however, these lamps may be one or two kinds of colored arc lamps or a combination of a white arc lamp and a colored arc lamp.

A movable body 31 is comprised of the parts 4-30 and is mounted movably to the holder 1 through a spring 32, for example, a spiral spring which is placed around the outer periphery of the casing 4 between the spring stopper 17 and the concave ring (convex ring on the inner wall) 2 of the holder 1 and is fixed at either or both ends thereof.

On condition that the holder 1 is fixed, the movable body 31 is moved to slide forward by pushing it against the tension of the spring 32 but moved to slide backward on relieving itself from the pressure of pushing by the tension of the spring 32.

When the cigarette light/battery checker of this invention is to be put in action, the push nob 18 is first pushed to slide the movable body 31 forward whereby the heater dish is brought into contact with the electrode plate 43 to permit heating of the heater 8 by the electric current sent from a battery E. When the cigarette lighter/battery checker is heated, the indicating lamp 24 as a variable illumination means connected in series to the heater 8 is illuminated and, at the same time, the indicating lamp 25 as a standard illumination means connected in parallel between the heater 8 and the indicating lamp 24 is also illuminated.

If the battery E is not considerably consumed, both indicating lamps 24 and 25 will be illuminated at the same level of brightness for the reasons as will be described hereinafter. If, however, consumption of the battery exceeds a certain level, the indicating lamp 24 will be illuminated somewhat darker than the indicating lamp 25, thus enabling one to check visibly the degree of consumption of the battery by comparing the brightness (intensity of illumination) of the variable illumination means with that of the standard illumination means.

Once the heater 8 has been heated, the push nob 18 is pulled back to disconnect the heater dish 7 from the electrode plate 43 and simultaneously to detach the heater part I from the basal part II for lighting up cigarette, as in the case of conventional cigarette lighters for use in automobiles. The cigarette lighter/battery checker of this invention may be equipped, if desired, with a conventional automatic pullback assembly (not shown in the drawings) which can automatically disconnect the electric circuit and concurrently pull back the pushed movable body 31 to the original position when the heater 8 has been heated sufficiently, lest the redundant electric current should be sent to superheat the heater 8.

Figure 3A:
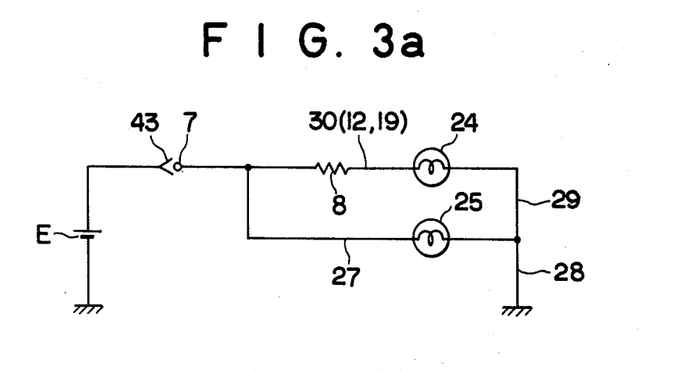
FIG. 3(a) is a circuit diagram showing one example of the battery checker of the present invention in the case of using a fully charged battery.
Figure 3B:
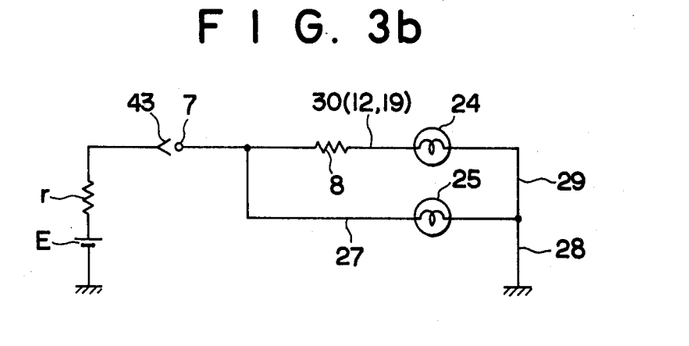
FIG. 3(b) is a circuit diagram as shown in FIG. 3(a) in the case of using a consumed battery.
Figure 4:
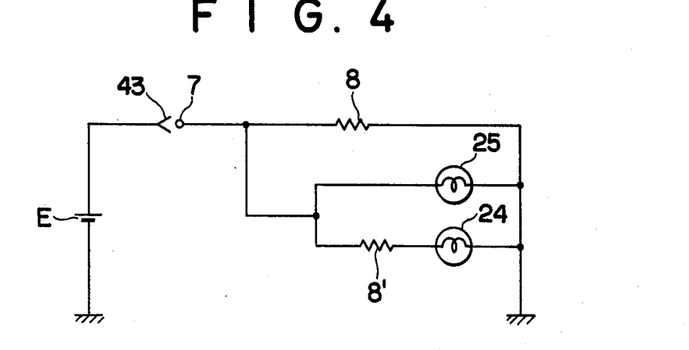
FIG. 4 is a circuit diagram showing another example of the battery checker of the present invention.

FIGS. 3 (a), 3(b) and 4 show electric circuits for embodiments of the battery checker of this invention, wherein the reference numerals have the same meanings as given in FIGS. 1 and 2. The set of FIGS. 3(a) and 3(b) stands for one embodiment of the electric circuits of the battery checker of this invention showing a relation between the degree of consumption of the battery E and the difference in brightness (intensity of illumination) of the indicating lamps 24 and 25.

In FIG. 3(a) showing the case of using a new or fully recharged battery, a lamp for a strong electric current is used as the indicating lamp 24 and a lamp for a weak electric current is used as the indicating lamp 25 and the brightness in illumination of both lamps is previously so selected or adjusted that they can be illuminated at the same level of brightness while the battery E keeps a rated output, or in other words, while consumption of the battery E does not go beyond the minumum necessary output.

In FIG. 3(b) showing the case of using a noticeably consumed battery, "r" stands for an internal resistance in the consumed battery. In this case, the value of "r" is too great to be negligible, so that the circuit for the lamp 24 is seriously influenced. Under such condition, no significant change occurs in brightness of the indicating lamp 25 for a weak electric current because it has originally a high resistance. Whereas, the brightness of the indicating lamp 24 having a low resistance is seriously influenced by increase of the internal resistance "r" so that the brilliance of the lamp 24 is considerably diminished as compared with the lamp 25, thus enabling one to discriminate the degree of consumption of the battery visually. The use of a slit 23' facilitates this discrimination.

In FIG. 4 showing another embodiment of electric circuit for the battery checker of this invention, the indicating lamp 24 for another example of a strong electric current is not connected in series to the heater 8 but connected in series to a resistor 8' which is in turn connected to the battery E. When a strong electric current is sent from the battery to heat the heater 8 in this embodiment, the indicating lamps 24 and 25 are simultaneously illuminated at the same level of brightness. If, however, consumption of the battery E proceeds, the brightness of the indicating lamp 24 will considerably be declined in the same manner as shown in FIG. 3(a) and FIG. 3(b), so that one can readily check the degree of consumption of the battery E by comparing the brilliance of the indicating lamp 24 with that of the indicating lamp 25.

In the embodiments shown in FIG. 3(a) and FIG. 4, the indicating lamp 24 for a strong electric current is so selected as to have the same level of brightness as of the indicating lamp 25 for a weak electric current. However, it is no matter if the indicating lamp 24 is brighter in illumination than the indicating lamp 25. In this case, consumption of the battery will visibly be shown by such phenomenon that the brilliance of the indicating lamp 24 is equivalent to that of the indicating lamp 25.

Figure 5:
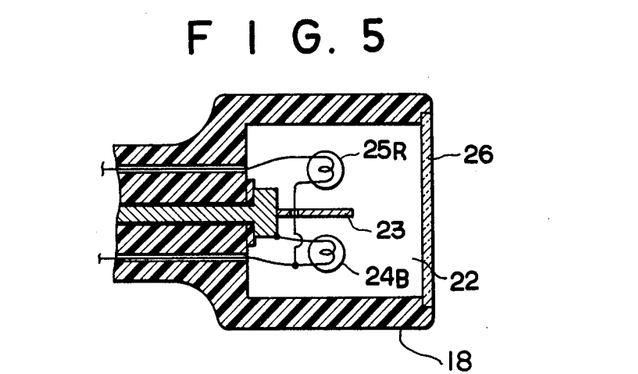
FIG. 5 is a sectional view showing a main part of still another example of the battery checker of the present invention.

In FIG. 5 showing still another embodiment of the battery checker of this invention, the chamber 22 is deeply recessed and a pair of a colored indicating lamp, for example, a blue indicating lamp 24B for a strong electric current and a differently colored indicating lamp, for example, a red indicating lamp 25R for a weak electric current is used for a means for checking the degree of consumption of the battery E. The other reference numerals seen in FIG. 5 have the same meanings as given in FIG. 2.

According to this embodiment, both indicating lamps 24B and 25R are previously adjusted or selected to have the same level of brightness in case of using a new or fully recharged battery. So long as the output of the battery is not attenuated, the blue and red illuminations of the lamps 24B and 25R are admixed in the chamber 22 whereby the translucent lid plate 26 is illuminated in yellow color. When the battery has more or less been consumed, the brightness of the indicating lamp 24B as the variable illumination means is diminished, notwithstanding the indicating lamp 25R as the standard illumination means keeps its original brightness, whereby the color of illumination on the plate 26 is changed from yellow to orange. As the color changed from orange to red according to increase in consumption of the battery, one can easily determine whether the battery is consumed or not, and can also check the degree of consumption according to the change in color of illumination reflected on the surface of the push nob of the cigarette lighter/battery checker.

According to this embodiment wherein the degree of consumption of a battery is discriminated by the change in color of illumination, checking of the battery can be made easily even in daytime, as compared with the embodiment shown in FIG. 2 and FIG. 3(a) or 3(b) wherein the degree of consumption of a battery is discriminated by change in illumination of the indicating lamps.

In this embodiment, the indicating lamp 24B functions as a variable illumination means and the indicating lamp 25R as a standard illumination means giving a steady coloration.

Figure 6:
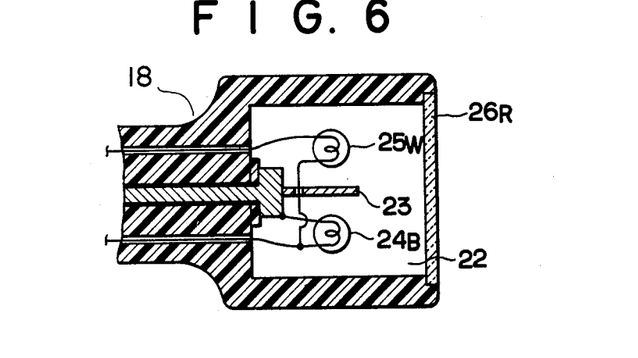
FIG. 6 is a sectional view showing a main part of further example of the battery checker of the present invention.

In FIG. 6 showing a variant of the embodiment shown in FIG. 5, a combination of a white indicating lamp 25W and a red transparent plate 26R is used as the standard color illumination means to be compared with a blue indicating lamp 24B used as the variable color illumination means. As the red illumination of the plate is admixed with the blue illumination of the indicating lamp 24B to attain the same effect as in the embodiment shown in FIG. 5, the degree of consumption of the battery E can be checked in a similar manner to that described in the embodiment shown in FIG. 5.

Figure 7:
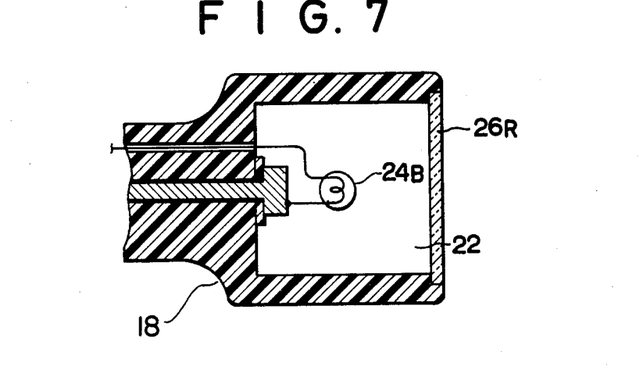
FIG. 7 is a sectional view showing a main part of still further example of the battery checker of the present invention.

In FIG. 7 showing another variant of the embodiment shown in FIG. 5, the structure of the battery checker is further simplified so that a red transparent plate 26R alone is used as the standard color illumination means and a blue indicating lamp 24B is used as a variable color illumination means. In this variant, the red transparent plate 26R is illuminated in red color by external light even in the event that the blue illumination of the indicating lamp 24B is diminished. Accordingly, the degree of consumption of the battery can be checked in the same manner as described in the embodiment shown in FIG. 5 by the color illumination on the plate 26R.

In this variant, a combination of the red transparent plate 26R and a white indicating lamp for a weak electric current may be used as the standard color illumination means.

In all of the embodiments shown in FIGS. 5–7, it is a matter of course that the colors and brightness of indicating lamps can adequately be selected so as to facilitate discrimination of the change in color illumination. For example, a combination of a blue transparent plate and a white indicating lamp as the standard color illumination means with a red indicating lamp as the variable color illumination means may be used for checking consumption of a battery.

The cigarette lighter/battery checker of this invention is particularly advantageous in that a small battery checker mechanism of a simple structure is incorporated into the push nob of a conventional cigarette lighter for use in automobiles without necessity of an additional space in the front instrument board so that one can easily check the condition of a battery for such purpose alone or simultaneously with lighting up a cigarette. It is also a feature of this invention that the degree of consumption of a battery can conveniently be checked visibly by comparing the brightness of a variable illumination means with the brightness of a standard illumination means. It is an additional feature of this invention that when color illumination means are used for both the variable illumination means and the standard illumination means, the difference in brightness between both illumination means is shown as change in color so that the checking of a battery can be made even in bright daytime.

The forms of the invention herein shown and described in detail are to be considered only as illustrative. It will be apparent to those skilled in the art that numerous modifications may be made therein without departure from the spirit of the invention or the scope of the appended claims.

What is claimed is:

1. A cigarette lighter with a built-in battery checker for use in automobiles which comprise two parts, one being a heater part in which a movable body provided with a heater at one end and a push nob at the other is mounted slidably in reciprocal front and rear directions to a holder and the other being a basal part into which the heater part is detachably inserted in such manner that when the nob is pushed to bring the heater into contact with an electrode plate connected to a battery, the heater can be heated by electric current from the battery so as to enable the heater part to be pulled out from the basal part, comprising:

the push nob being provided inside with a variable illumination means in which brightness of the illumination is diminished according to increase in the degree of consumption of the battery; and the push nob being further provided inside with a standard illumination means for comparison in brightness with the variable illumination means.

2. A cigarette lighter with a built-in battery checker according to claim 1 wherein the variable illumination means is an indicating lamp which is illuminated in white color by a strong electric current, and the standard illumination means is an indicating lamp which is illuminated in white color by a weak electric current.

3. A cigarette lighter with a built-in battery checker according to claim 1 wherein the variable illumination means is a colored indicating lamp which is illuminated by a strong electric current while the standard illumination means is a colored indicating lamp which is illuminated by a weak electric current.

4. A cigarette lighter with a built-in battery checker according to claim 1 wherein the variable illumination means includes a combination of an indicating lamp which is illuminated in white color by a strong electric current and a colored transparent plate.

5. A cigarette lighter with a built-in battery checker according to claim 3 wherein the standard illumination means is a colored transparent plate.

6. A cigarette lighter with a built-in battery checker according to claim 1 wherein the standard illumination means includes a combination of an indicating lamp which is illuminated in white color by a weak electric current and a colored transparent plate.

7. A cigarette lighter with a built-in battery checker for use in vehicles provided with a battery including a heater part provided with a heater attached to a push nob mounted slidably in reciprocal front and rear directions to a holder for use with a basal part into which the heater part may be detachably inserted in such manner that when the nob is pushed to bring the heater into contact with an electrode therein connected to said battery, the heater can be heated by electric current from the battery and also the battery charge checked, comprising:

the push nob being provided with a variable illumination means in which a noticeable characteristic of the illumination is changed according to a decrease in the degree of charge of the battery; and the push nob being further provided with a standard illumination means for comparison of a similar characteristic thereof with that of the variable illumination means.

8. A cigarette lighter with a built-in battery checker according to claim 7, wherein the variable illumination means includes a white indicating lamp which is illuminated by a strong electric current, and the standard illumination means includes a white indicating lamp which is illuminated by a weak electric current.

9. A cigarette lighter with a built-in battery checker according to claim 7, wherein the variable illumination means includes a colored indicating lamp which is illuminated by a strong electric current, and the standard illumination means includes a colored indicating lamp which is illuminated by a weak electric current.

10. A cirgarette lighter with a built-in battery checker according to claim 7, wherein the variable illumination means includes a combination of a white indicating lamp which is illuminated by a strong electric current and a colored transparent plate, and the standard illumination means includes a colored indicating lamp which is illuminated by a weak electric current.

11. A cigarette lighter with a built-in battery checker according to claim 7, wherein the standard illumination means includes a colored transparent plate.

12. A cigarette lighter with a built-in battery checker according to claim 7, wherein the standard illumination means is a combination of a white indicating lamp which is illuminated by a weak electric current and a colored transparent plate.

13. A heater part for a cigarette lighter usable in vehicles having a battery wherein it is desirable to check the charge of the battery comprising:

a combination nob and heater part;

said nob being provided with a standard illumination means energizable by said battery when the heater is being energized; and a variable illumination means having a characteristic which changes according to a change in the degree of battery charge so that by comparing said characteristics of said variable illumination means with a similar characteristic of said standard illumination means an observer can check the battery.

* * * * *

UNITED STATES PATENT AND TRADEMARK OFFICE
CERTIFICATE OF CORRECTION

PATENT NO. : 4,270,038

DATED : May 26, 1981

INVENTOR(S) : Yoshinori Warihashi

It is certified that error appears in the above—identified patent and that said Letters Patent is hereby corrected as shown below:

Front page, (30) Priority Data, "53/31581" should read
-- 53/31589 --.

last line, second column, "7 Drawing Figures" should read

-- 8 Drawing Figures --.

Figures 1 and 2 should appear as shown on the attached sheets.

Column 1, line 14, "comsumption" should read -- consumption --.
         line 24, "be started" should read -- start --.
         line 26, delete "an".
         line 49, "signal" should read -- single --.
         lines 59 and 66, "is" should read -- is a --.
Column 2, lines 48 and 51, "of" should read -- of a --.
Column 4, line 26, "up" should read -- up a --.

UNITED STATES PATENT AND TRADEMARK OFFICE
CERTIFICATE OF CORRECTION

PATENT NO. : 4,270,038

DATED : May 26, 1981

INVENTOR(S) : Yoshinori Warihashi

It is certified that error appears in the above—identified patent and that said Letters Patent is hereby corrected as shown below:

Column 5, line 14, "considerably be" should read

-- be considerably --.

line 30, "of a" should read -- of --; same line 30, "lamp," should read -- lamps, --.

Column 6, line 67, "comprise" should read -- comprises --.

Signed and Sealed this

Twenty-seventh Day of October 1981

[SEAL]

Attest:

GERALD J. MOSSINGHOFF

Attesting Officer

Commissioner of Patents and Trademarks

FIG. 2